United States Patent [19]

Peppers

[11] Patent Number: 4,598,347
[45] Date of Patent: Jul. 1, 1986

[54] HEAT SINK FLOODLIGHT CASING AND REFLECTOR

[75] Inventor: James E. Peppers, Memphis, Tenn.

[73] Assignee: FL Industries, Inc., Livingston, N.J.

[21] Appl. No.: 662,341

[22] Filed: Oct. 18, 1984

[51] Int. Cl.⁴ ............................................. F21V 29/00
[52] U.S. Cl. ..................................... 362/373; 362/294
[58] Field of Search ............... 362/294, 373, 362, 418, 362/419, 345, 217, 218

[56] References Cited

U.S. PATENT DOCUMENTS

| | | | |
|---|---|---|---|
| 3,560,728 | 2/1967 | Atkin | 362/294 |
| 3,751,657 | 8/1973 | Sangiamo et al. | 362/294 |
| 3,819,929 | 6/1974 | Newman | 362/218 |
| 4,507,719 | 3/1985 | Quiogue | 362/373 |

FOREIGN PATENT DOCUMENTS 447984  3/1968  Switzerland ..................... 362/373

*Primary Examiner*—E. Rollins Cross
*Attorney, Agent, or Firm*—Laff, Whitesel, Conte & Saret

[57] ABSTRACT

A floodlight housing is provided including a metal casing having top, bottom, side and rear walls. A plurality of elongated fins protrude from the rear wall of the casing to form a heat sink assembly. The entire casing and elongated fins are formed of cast aluminum. The housing is adapted to have an electric lamp and reflector assembly mounted within. The reflector is affixed to one of the walls of the casing in the area of maximum heat concentration from the lamp.

6 Claims, 1 Drawing Figure

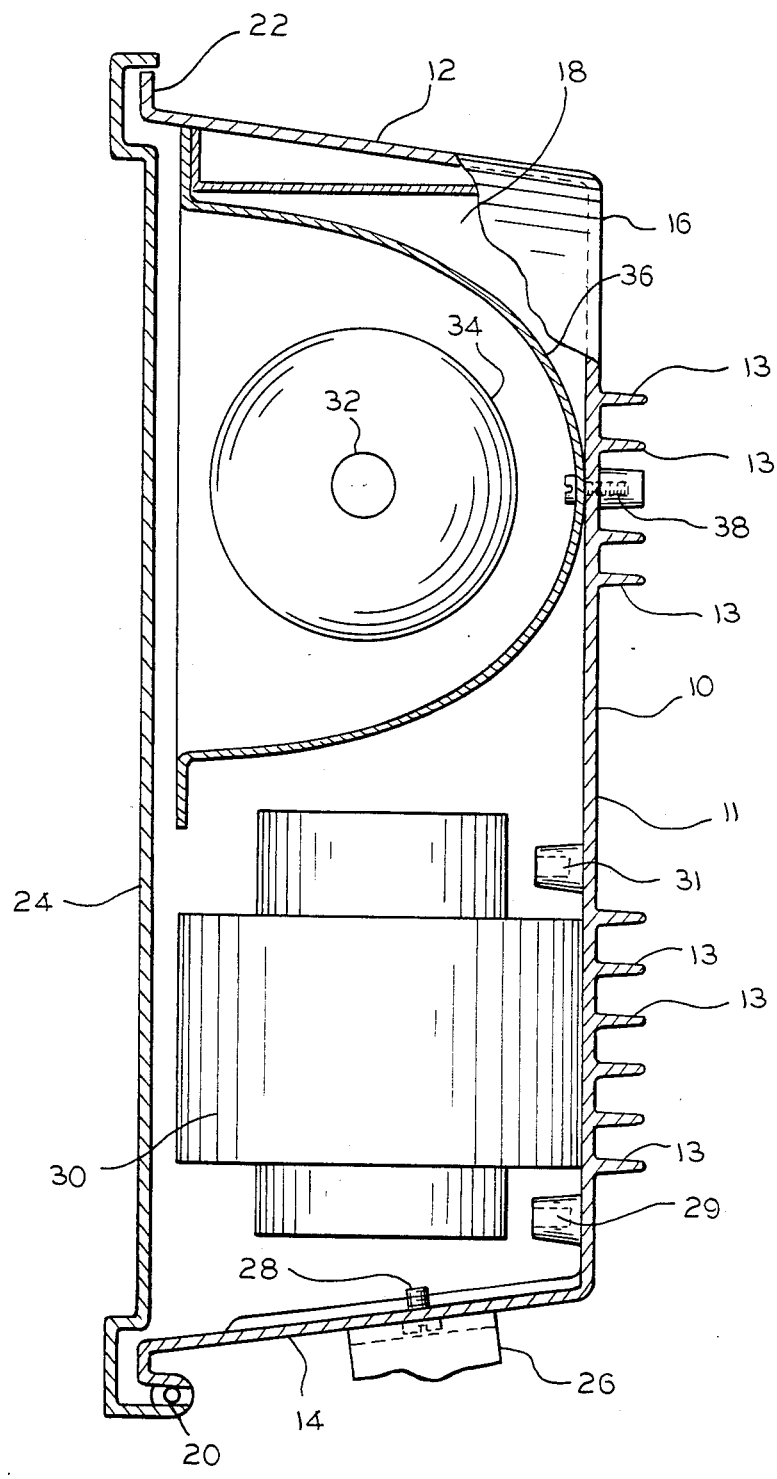

HEAT SINK FLOODLIGHT CASING AND REFLECTOR

BACKGROUND OF THE INVENTION

The present invention relates to floodlight and, more particularly, to a housing for an electric lamp floodlight wherein the housing includes a heat sink assembly.

Heat is a major cause of lamp failure and shortened lamp life in electric lamp fixtures. This is especially true in small, high wattage floodlight fixtures employing lamps such as high pressure sodium vapor lamps. In such lamps, arc tube voltage is directly related to temperature. Excess temperatures produce high arc tube voltages which shorten lamp life. Such sodium vapor lamps have an excess of sodium mercury mixture in a reservoir. As the temperature of the lamp increases, more of the mixture is forced into the arc tube current. This effect raises the voltage across the lamp.

In large light fixtures, heat is not a major problem because of the physical size of the fixture which acts to dissipate the heat. However, in small light fixtures, especially high wattage light fixtures, heat build up is a major problem.

Accordingly, it is an object of the present invention to provide a high wattage light fixture with improved heat dissipation properties.

SUMMARY OF THE INVENTION

The present invention provides a light fixture in a high wattage lamp having improved heat dissipation properties.

It is desirable to reduce the operating temperature of a high wattage electric lamp such as a high pressure sodium arc lamp. Reduction of the operating temperature of the lamp reduces the arc tube voltage and, accordingly, increases lamp life. Heat concentration is a major problem in such relatively small, high wattage light fixtures. Such heat concentration is mainly the result of the small reflector assembly. By connecting a portion of the reflector at the area of greatest heat concentration behind the lamp's arc tube to the light fixture housing and by forming a heat sink assembly on an outer surface of the housing, heat is conducted away from the reflector and arc tube and, accordingly, the operating temperature and voltage of the lamp are reduced.

The light fixture housing is typically a one piece cast aluminum assembly having good heat conduction properties. By connecting a portion of the reflector behind the arc tube to the housing, radiant heat from the lamp is transferred to the housing. Improved heat dissipation for the housing is provided by utilizing a plurality of fins protruding from an outer surface of the housing. Such fins form a heat sink assembly with the reflector and the housing.

The light fixture housing for a small, high wattage lamp is usually of a rectangular shape having a rear wall with top, bottom and side walls affixed thereto and protruding therefrom to form a box like assembly. A lamp and reflector are mounted in the housing. The reflector is joined, usually by a bolt or screw, to a wall of the housing. Because of physical considerations, the reflector is usually joined to the rear wall of the housing. It is desirable to locate the reflector at the area of maximum heat concentration from the lamp. A bezel is fitted across the open front of the housing. A plurality of fins protrude from an outside surface of one of the housing walls behind the arc tube area to form a heat sink assembly. Usually, again because of physical considerations, the fins protrude from the rear wall of the housing behind the arc tube of the lamp which also assures good heat transfer from the reflector through the rear wall to the fins.

In particular, the present invention provides a floodlight housing comprising a generally rectangular shaped metal casing having a rear wall with top, bottom and side walls joined thereto, and a plurality of elongated fins protruding from the outer surface of one of said housing walls to form a heat sink assembly with the reflector and the housing.

BRIEF DESCRIPTION OF THE DRAWING

In the drawing, a cross sectional top view is provided of a floodlight housing in accordance with the present invention.

DESCRIPTION OF THE PREFERRED EMBODIMENT

Referring now to the drawing, one embodiment of a floodlight in accordance with the present invention is shown. The floodlight comprises a five sided, box like housing structure 11 having a rear wall 10 joined to top wall 12 and bottom wall 14 and to sidewalls 16 and 18. Sidewall 16 is only partially visible in this view as most of it must be cut away to show the interior of the floodlight. Housing 11 is usually formed of a single casting of aluminum. Protruding from the outside surface of rear wall 10 are a plurality of fins 13 which are usually formed and cast as an integral part of rear wall 10 of housing 11. Other housing constructions, such as sheet metal, are also applicable. Fins 13 form a heat sink assembly with the reflector and the housing.

Bottom wall 14 terminates in hinge 20 along its distal edge away from rear wall 10. Top wall 12 terminates in a lip 22 along its distal edge away from rear wall 10. Bezel 24 is fitted into hinge 20 and lip 22 to form a front surface for housing 11 thereby providing the sixth wall to close the box like structure of the floodlight housing. Bezel 24 normally is comprised of a glass or plastic material with appropriate edge structure to accommodate hinge 20 and lip 22. Bezel 24 is thusly able to be opened at top lip 22 and swung downwardly along hinge 20 to provide ease of maintenance.

Housing 11 is supported by a mounting bracket 26 affixed to the outside surface of bottom wall 14 by a bolt or screw 28. A ballast transformer 30 is mounted to the inside surface of rear wall 10 by any suitable means such as bolts inserted in mounting bosses 29,31.

An arc tube 32 having a lamp envelope 34 is mounted within housing 11. Arc tube 32 usually comprises a high wattage tube such as a high pressure sodium arc lamp. Surrounding lamp envelope 34 is reflector 36. Reflector 36 is usually of a parabolic or another geometric cross section having its center or mounting point affixed to rear wall 10 by means such as bolt 38. Other techniques may be used to make thermal contact between reflector 36 and wall 10 rather than using a bolt 38. Such connection of reflector 36 to rear wall 10 behind the lamp's arc tube assures improved heat transfer from reflector 36 to rear wall 10. Thermal compounds such as silicon grease may be applied between the reflector 36 and rear wall 10 for additional improvement in heat transfer. Accordingly, the entire housing provides heat dissipation for the floodlight, with such heat dissipation being especially aided by the location of the reflector to the housing and by fins 13 forming the heat sink assembly on the outer surface of rear wall 10.

It is possible to conceive of other embodiments of the present invention including placing heat sink fins on other walls or more than one outside wall of the housing and mounting the lamp reflector to a wall other than the rear wall of the housing as may be required by floodlight design. However, the area of concern is the area of the reflector that is closest to the lamp's arc tube where the maximum temperatures exist. Therefore, heat sinking techniques are applied most effectively in this area.

What is claimed is:

1. A floodlight for a lamp with an arc tube comprising:
   a metal casing forming a housing;
   a bezel mounted across the front of said housing;
   a reflector assembly within said housing, said reflector being in direct contact with an internal surface of said housing, and a plurality of elongated fins integrally protruding from an external surface of said housing to form a heat sink assembly with the reflector and the housing.

2. The floodlight of claim 1 wherein said lamp is mounted within said housing, said lamp having an axial center, said axial center defining various radial distances from said reflector and the reflector is in contact with said internal surface behind said lamp at substantially a smallest of said radial distances, whereby said reflector is in contact with said internal surface substantially in an area of maximum heat concentration from said arc tube.

3. The floodlight of claim 2 wherein said housing is of a generally rectangular shape, having an open front adapted to receive said bezel, and a rear wall joined to a top, a bottom and two side walls.

4. The floodlight of claim 2 wherein a mounting bracket is affixed to an outer surface of said housing.

5. The floodlight of claim 1 wherein said plurality of elongated fins protrude from the external surface of a rear wall of said housing said fins protruding in part about an area on the external surface opposite where said reflector is in contact with said external surface.

6. The floodlight of claim 1 wherein said plurality of elongated fins protrude from the external surface of a rear wall of said housing.

* * * * *